United States Patent [19]
Laura

[11] Patent Number: 5,951,640
[45] Date of Patent: Sep. 14, 1999

[54] METHOD AND APPARATUS FOR CREATING CONDITION SETS AND EXTRACTION PROGRAMS TO IDENTIFY AND RETRIEVE DATA FROM FILES IN A NETWORK

[75] Inventor: Joseph Griffin Laura, Plano, Tex.

[73] Assignee: Sprint Communications Co., L.P., K.C., Mo.

[21] Appl. No.: 08/801,375

[22] Filed: Feb. 19, 1997

[51] Int. Cl.⁶ .................................................. G06F 13/00
[52] U.S. Cl. ............................ 709/217; 709/219; 707/10
[58] Field of Search ........................ 395/200.47, 200.46, 395/200.43, 200.49; 707/10

[56] References Cited

U.S. PATENT DOCUMENTS

| | | | |
|---|---|---|---|
| 5,263,157 | 11/1993 | Janis | 395/200.47 |
| 5,422,999 | 6/1995 | Travis et al. | 395/200.47 |
| 5,598,524 | 1/1997 | Johnston, Jr. et al. | 395/348 |
| 5,668,950 | 9/1997 | Kikuchi et al. | 395/200.47 |
| 5,715,443 | 2/1998 | Yanagihara et al. | 395/200.47 |
| 5,724,575 | 3/1998 | Hoover et al. | 395/200.47 |
| 5,752,244 | 5/1998 | Rose et al. | 707/5 |
| 5,802,518 | 9/1998 | Karaev et al. | 707/9 |

*Primary Examiner*—Zarni Maung
*Attorney, Agent, or Firm*—Harley R. Ball; Bruce C. McClelland

[57] ABSTRACT

A data identification and retrieval method and apparatus is disclosed. The method is implemented with the aid of a computer program or programs that operate a computer network (10) for permitting a user to easily identify and retrieve data from files stored on any computer (14, 16, 18, 20) in the network regardless of the location of the computers, the format of the data and the storage medium on which the data is stored.

14 Claims, 2 Drawing Sheets

METHOD AND APPARATUS FOR CREATING CONDITION SETS AND EXTRACTION PROGRAMS TO IDENTIFY AND RETRIEVE DATA FROM FILES IN A NETWORK

BACKGROUND OF THE INVENTION

1. Field of the Invention

The present invention relates to methods for identifying and retrieving data in computer networks. More particularly, the invention relates to a data identification and retrieval method and apparatus for use with a computer network that permits a user to easily identify and retrieve data from files stored on any computer in the network regardless of the location of the computers, the format of the data and the storage medium on which the data is stored.

2. Description of the Prior Art

Data analysts and other information specialists often must locate and analyze data from a wide variety of sources. Unfortunately, the needed data is often stored on many different computers in a computer network and stored in many different formats and on different storage medium. For example, the data may be stored on the user's host computer or a production computer in another city, state or country. The data on these computers may be stored on magnetic tape, tape cartridges or disks. The format of the data may be sequential, fixed length, variable length or VSAM. This lack of uniformity in the location and format of needed data makes it difficult for non-technical employees to quickly and easily identify, retrieve, and analyze data necessary to do their jobs.

As a result of these limitations, non-technical users often retrieve data that is stored on remote computers in a computer network by contacting other employees that are located at the remote computer site. The other employees must then locate and retrieve the data from their computers and send the data to the requesting user. These steps significantly increase the amount of time required to retrieve and analyze data.

Accordingly, a need exists for an improved method and apparatus for identifying and retrieving data from a computer network. More particularly, a need exists for such a method and apparatus that permits non-technical users to quickly and easily identify, retrieve and analyze data from any computer within a computer network regardless of where the computer is located, the format of the data, and the storage medium on which the data is stored.

SUMMARY OF THE INVENTION

The present invention solves the above-described problems and provides a distinct advance in the art of data identification and retrieval methods and apparatus. More particularly, the present invention provides an improved method and apparatus for identifying and retrieving data that permits non-technical users to quickly and easily identify, retrieve and analyze data from any computer within a computer network regardless of where the computer is located, the format of the data, and the storage medium on which the data is stored.

The method of the present invention is implemented with the aid of a computer program or programs that operate a computer network including a data retrieval computer such as an IBM-type mainframe computer. The method operates the computer network for permitting a user to identify and retrieve data from files each having a plurality of fields with data therein.

The computer programs of the present invention are table or template-driven so that non-technical users can easily understand and follow the method. To begin the method, the user fills out a template in a user computer identifying: a file or files that contain requested data, the location of one or more production computers in the network where the files are stored, and a condition set having criteria specifying a field or fields within the files the user wishes to retrieve. The entered information is then transferred to a host computer networked with the user computer.

The computer programs then direct the host computer to create an extraction program operable for locating and copying the requested fields. The host computer then sends the extraction program along with the condition set and location information to the production computers that contain the requested data.

The production computers run the extraction program to locate the files and retrieve the fields that meet the criteria set forth in the condition set. The production computers then send the requested fields to the user's host computer where the data is stored in a user-specified data repository file.

The computer programs also include a user interface that permits the user to view the contents of the data repository and to determine if additional data is needed. Once the data is in the data repository, the user can extract sub-sets of the data based on user-specified conditions or may analyze the data based on the criteria entered in the above-described condition set.

BRIEF DESCRIPTION OF THE DRAWING FIGURES

A preferred embodiment of the present invention is described in detail below with reference to the attached drawing FIG. 1 which is a block diagram of a computer network that may be used in performing the steps of the present invention.

FIG. 2 presents a flow diagram illustrating processing in accordance with the present invention.

DETAILED DESCRIPTION OF THE PREFERRED EMBODIMENTS

Figure 1:
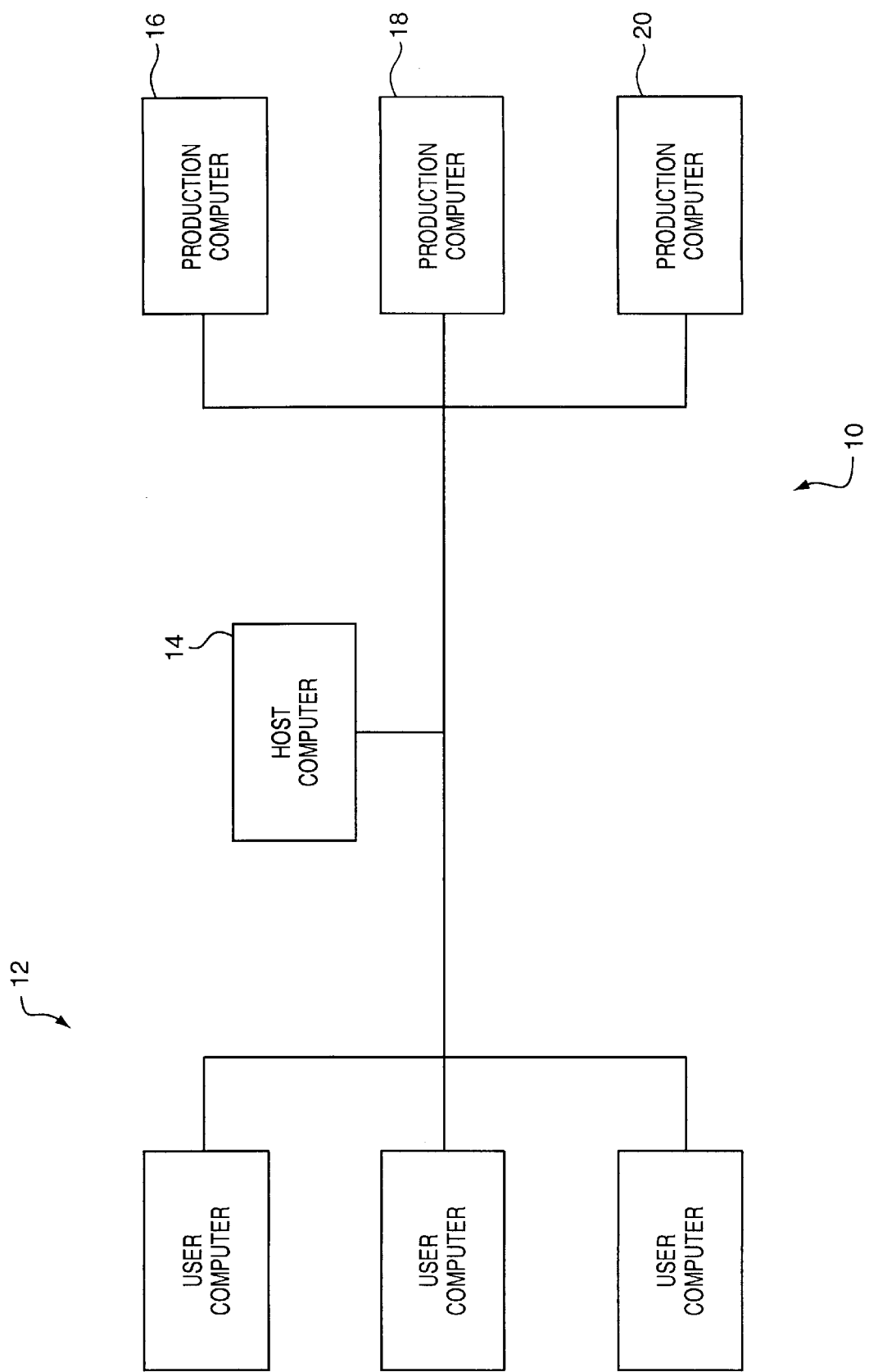

The method of the present invention is implemented with the aid of a computer program or programs that operate a computer network 10 such as the one illustrated in the drawing figure. The preferred computer network 10 includes at least one user computer 12, a host computer 14, and a plurality of production computers 16, 18, 20 located at various locations remote from the user computers 12.

The user computers 12 are preferably IBM-type personal computers supported by IBM's TSO and Dialog Management systems. The host computer 14 and production computers 16, 18, 20 are preferably IBM ES9000 series mainframe computers. The computers 12, 14, 16, 18, 20 are coupled together in a conventional network and are interfaced by Network Data Mover communication protocol. Those skilled in the art will appreciate that the preferred network 10 and computers 12, 14, 16, 18, 20 described herein may be substituted with other equivalent components without departing from the scope of the present invention.

The computer programs for implementing the method of the present invention are preferably written and compiled using IBM COBOL 2 language or other suitable language. The computer programs operate the computer network 10 to permit a user to identify and retrieve data from files stored in any of the computers 12, 14, 16, 18, 20 in the network 10 regardless of the location of the computers, the format of the data and the storage medium on which the data is stored.

The computer programs are table or template-driven so that non-technical users can easily understand and follow the method. To begin the method, a user first populates or fills out a table or template in one of the user computers 12 to identify a file or files that contain requested data, the location of one or more production computers 16, 18, 20 in the network where the files are stored, and a condition set having criteria specifying a field or fields within the files the user wishes to retrieve.

The computer programs allow the user to either select an existing condition set or construct a new one. To build a new condition set, the computer programs prompt the user to populate the identification fields "Group Name, Release/Type, File, Condition Set, and Field".

The Group Name identification field identifies groups within the network such as an application group, a user community group, or a personal group. The computer programs allow the user to select an existing group, update an existing group, add a new group, or delete a group.

The Release/Type identification field indicates the level of testing for the condition set. The computer programs allow the user to select an existing Release/Type, update an existing Release/Type, add an new Release/Type or delete a Release/Type.

After the Group and Release/Type identification fields have been populated, the user populates the File identification field to define or select a file for the selected combination Group and Release/Type. The File identification field: (1) identifies what type of production files will be read to build a data repository for the user that satisfies the user's condition sets, (2) identifies a copybook or a map for identifying which fields within the files are to be retrieved, and (3) permits the user to create a schedule of production files that will be accessed to build the user's data repository.

The computer programs provide the user with a library of copybooks that can be copied to accommodate the selected Group and Release/Type. Each copybook is a map for its respective file that provides a template from which fields in the file can be selected that meet the criteria of the user's condition set. Each copybook has information about each field within its file including the format, length, and offset of the fields.

After the copybook has been selected, the computer programs prompt the user to indicate which of the production computers 16, 18, 20 the user wishes to retrieve data from to build the data repository. The computer programs prompt the user to enter a model DSN prefix for the selected production computers, a description of the types of production files to be retrieved, and a level indicator that indicates the dataset within the computer identified by the DSN prefix that the user wishes to access.

The computer programs also permit the user to select how often the selected files are accessed to build the user's data repository. For example, the user may direct the computer programs to access the files daily or monthly.

After the user has selected or populated the Group, Release/Type and File identification fields, the computer programs prompt the user to define or select a condition set which is used to identify fields within the selected files the user wishes to access and retrieve. The condition set includes criteria or conditions that are applied to the copybooks of the selected files to select desired fields within the files.

As an example of a condition set, the user may wish to verify that 800 number telephone service call forwarding is working correctly. The user first determines that the needed information is stored in a file named "CALLFILE" stored on production computer 18.

The copybook for the CALLFILE may contain over 200 fields, but the user may only need information from three fields, for example, fields that verify that the BCID is 100, the originating MPA is 800, and the Route Advance is 1. The user may then construct the following condition set:

File: CALLFILE Copybook MEACIXXX

Condition Set Name: 800ROUTE Description: Verify 800 call forwarding. Number required: 100.

BCID=100 AND ORIGINATING NPA=800 AND ROUTE ADVANCE=1.

The user may then construct the following File Mapping:

Site: PRODUCTION COMPUTER 18 Dataset name: PCTDAL.DSK.DAILY.CALL.FILE Extract

Schedule: Daily 11/1–11/15/96.

This condition set and file map set up a daily extraction of 800 number call routing information from the production computer 18 beginning on 11/1 and ending on 11/15 and pull up 100 calls that match the user's criteria set forth in the condition set.

The computer programs also permit the user to save the condition sets and file maps for later use so that similar data can be retrieved again. For example, if the user wishes to use the condition set and file map set forth above to obtain data at a later time, the user may retrieve the existing condition set and file map and change the effective date on the file map. This permits computer skilled analysts to initially set up the condition sets and file maps while allowing non-technical users to use the condition sets and file maps to locate and retrieve needed data without understanding the details of the condition sets or file maps.

After the user has entered all the information needed to select an existing condition set or construct a new condition set, the computer programs direct the host computer 14 to create an extraction program operable for locating and copying the requested fields from the selected files. The host computer 14 then sends the extraction program along with the condition set and location information to the appropriate production computer or computers 16, 18, 20 that contain the requested data.

Once the selected production computer receives the extraction program and condition set, it performs a catalog search to locate the selected files and assembles the necessary Job Control Language to run the extraction program to locate and retrieve the fields from the files that meet the criteria set forth in the condition set. The production computers 16, 18, 20 then send the requested fields to the user's host computer 14 where the data is stored in a user-specified data repository file.

For example, using the above-described condition set and file map, the computer programs will construct an extraction program that is operable for identifying and retrieving 800 number route advance calls from a CALLFILE on the production computer 18. The host computer 14 then sends the extraction program and the file map to the production computer 18 using Network Data Mover. The production computer 18 runs the extraction program as described above to locate and retrieve the requested fields from the selected files and then sends the retrieved fields back to the host computer for storage in the user's data repository file.

To facilitate analysis of the retrieved data that is stored in the data repository files, the computer programs include a user interface that permits the user to view the contents of the data repository and to determine if additional data is needed. Once the data is in the data repository, the user can extract sub-sets of the data based on user-specified conditions or may analyze the data based on the criteria entered in the above-described condition set.

Figure 2:
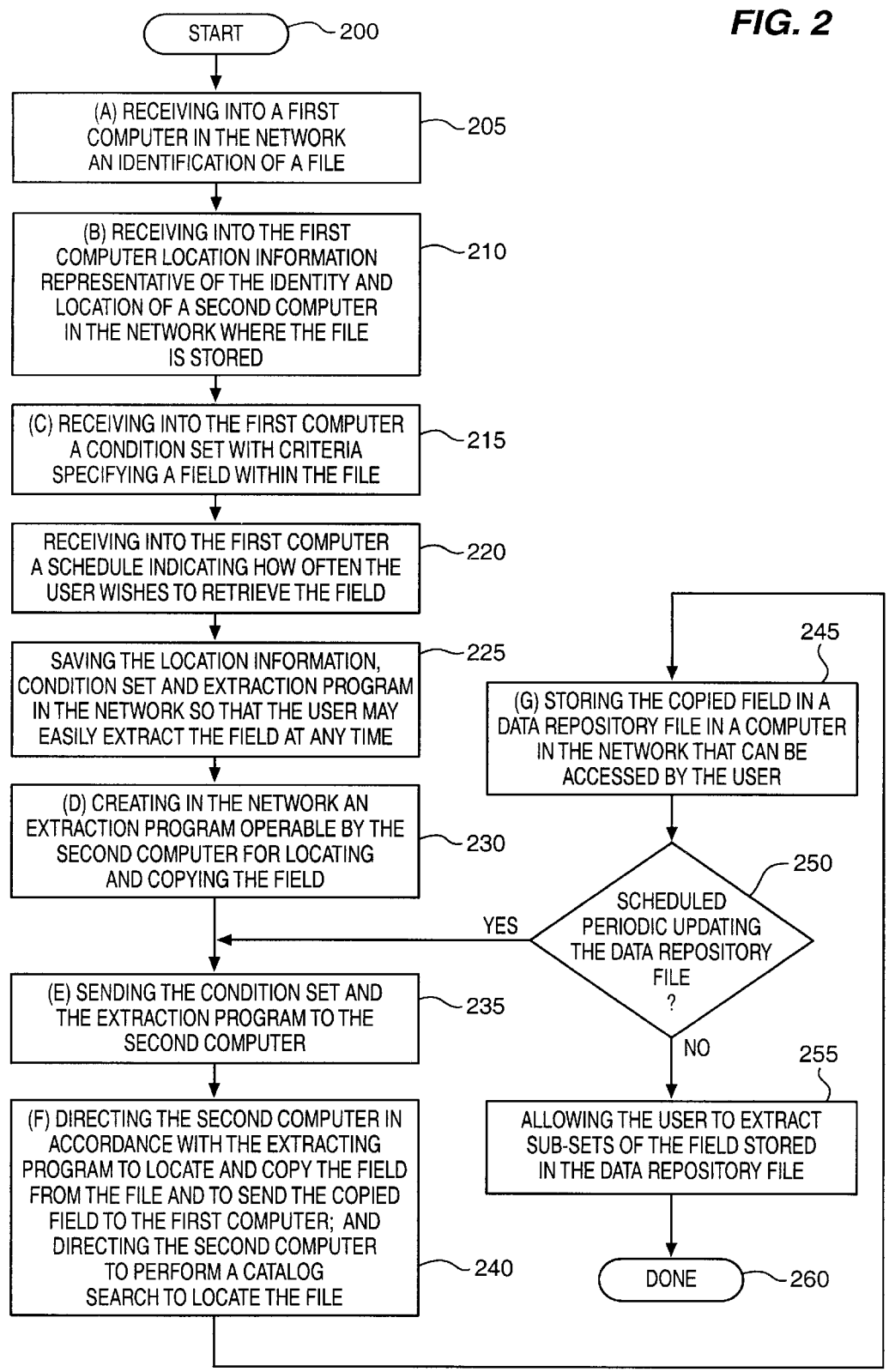

Turning now to FIG. 2, illustrated are steps 200–260 for a method of operating a computer network for permitting a user to identify and retrieve data from files stored on computers in the network, each of the files including a plurality of fields having data stored therein, the method comprising the step of (a) receiving into a first computer in the network an identification of a file (step 205); (b) receiving into the first computer location information representative of the identity and location of a second computer in the network where the file is stored (step 210); (c) receiving into the first computer a condition set with criteria specifying a field within the file (step 215); (d) in response to steps (a)–(c), creating in the network an extraction program operable by the second computer for locating and copying the field (step 230); (e) sending the condition set and the extraction program to the second computer (step 235); (f) directing the second computer in accordance with the extracting program to locate and copy the field from the file and to send the copied field to the first computer (step 240); and (g) storing the copied field in a data repository file in a computer in the network that can be accessed by the user (step 245). In an embodiment, this method further includes the steps of receiving into the first computer a schedule indicating how often the user wishes to retrieve the field (step 220); and repeating steps (e)–(g) according to the schedule for periodically updating the data repository file (step 250). In an embodiment of the present invention, the method further includes the step of saving the location information, condition set, and extraction program in the network so that the user may easily extract the field at any time (step 225). In an embodiment of the present invention, the extraction program is created in a host computer networked with the first and second computers; and preferably, the host computer is a mainframe computer. In an embodiment of the present invention, step (f) further includes the step of directing the second computer to assemble Job Control Language needed to run the extraction program; and preferably, step (f) further includes the step of directing the second computer to perform a catalog search to locate the file as illustrated in step 240. In an embodiment of the present invention, the method further includes, after step (g), the step of allowing the user to extract sub-sets of the field stored in the data repository file (step 255).

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of operating a computer network for permitting a user to identify and retrieve data from files stored on computers in the network, each of the files including a plurality of fields having data stored therein, the method comprising the steps of:

(a) receiving into a first computer in the network an identification of a file;

(b) receiving into the first computer location information representative of the identity and location of a second computer in the network where the file is stored;

(c) receiving into the first computer a condition set with criteria specifying a field within the file;

(d) in response to steps (a)–(c), creating in the network an extraction program operable by the second computer for locating and copying the field;

(e) sending the condition set and the extraction program to the second computer;

(f) directing the second computer in accordance with the extraction program to locate and copy the field from the file and to send the copied field to the first computer; and (g) storing the copied field in a data repository file in a computer in the network that can be accessed by the user.

2. The method as set forth in claim 1, further including the steps of:

receiving into the first computer a schedule indicating how often the user wishes to retrieve the field; and repeating steps (e)–(g) according to the schedule for periodically updating the data repository file.

3. The method as set forth in claim 1, further including the step of saving the location information, condition set, and extraction program in the network so that the user may easily extract the field at any time.

4. The method as set forth in claim 1, wherein the extraction program is created in a host computer networked with the first and second computers.

5. The method as set forth in claim 4, wherein the host computer is a mainframe computer.

6. The method as set forth in claim 1, step (f) further including the step of directing the second computer to assemble Job Control Language needed to run the extraction program.

7. The method as set forth in claim 6, step (f) further including the step of directing the second computer to perform a catalog search to locate the file.

8. The method as set forth in claim 1, further including, after step (g), the step of allowing the user to extract sub-sets of the field stored in the data repository file.

9. A data locating and extracting computer for identifying and extracting data from files stored on computers networked with the extracting computer, each of the files including a plurality of fields having data stored therein, the extracting computer comprising:

means for receiving from a user computer networked with the extracting computer an identification of a file;

means for receiving from the user computer location information representative of the identity and location of a production computer in the network where the file is stored;

means for receiving from the user computer a condition set having criteria specifying a field within the file;

means for creating an extraction program operable by the production computer for locating and copying the field from the production computer; and means for sending the condition set and the extraction program to the production computer to direct the production computer to locate and copy the field from the file and send the copied field to a computer accessible by the user.

10. The data locating and extracting computer as set forth in claim 9, further including means for creating a data repository file for storing the copied field and means for storing the copied fields in the data repository.

11. The data locating and extracting computer set forth in claim 10, further including means for allowing the user to extract sub-sets of the field stored in the data repository file.

12. The data locating and extracting computer as set forth in claim 9, further including means for saving the location information, condition set, and extraction program in the network so that the user may easily extract the field at any time.

13. The data locating and extracting computer as set forth in claim 9, further including means for directing the production computer to assemble Job Control Language needed to run the extraction program.

14. The data locating and extracting computer as set forth in claim 13, further including means for directing the production computer to perform a catalog search to locate the file.

* * * * *